W. A. PITT.
Filter.
No. 225,863. Patented Mar. 23, 1880.
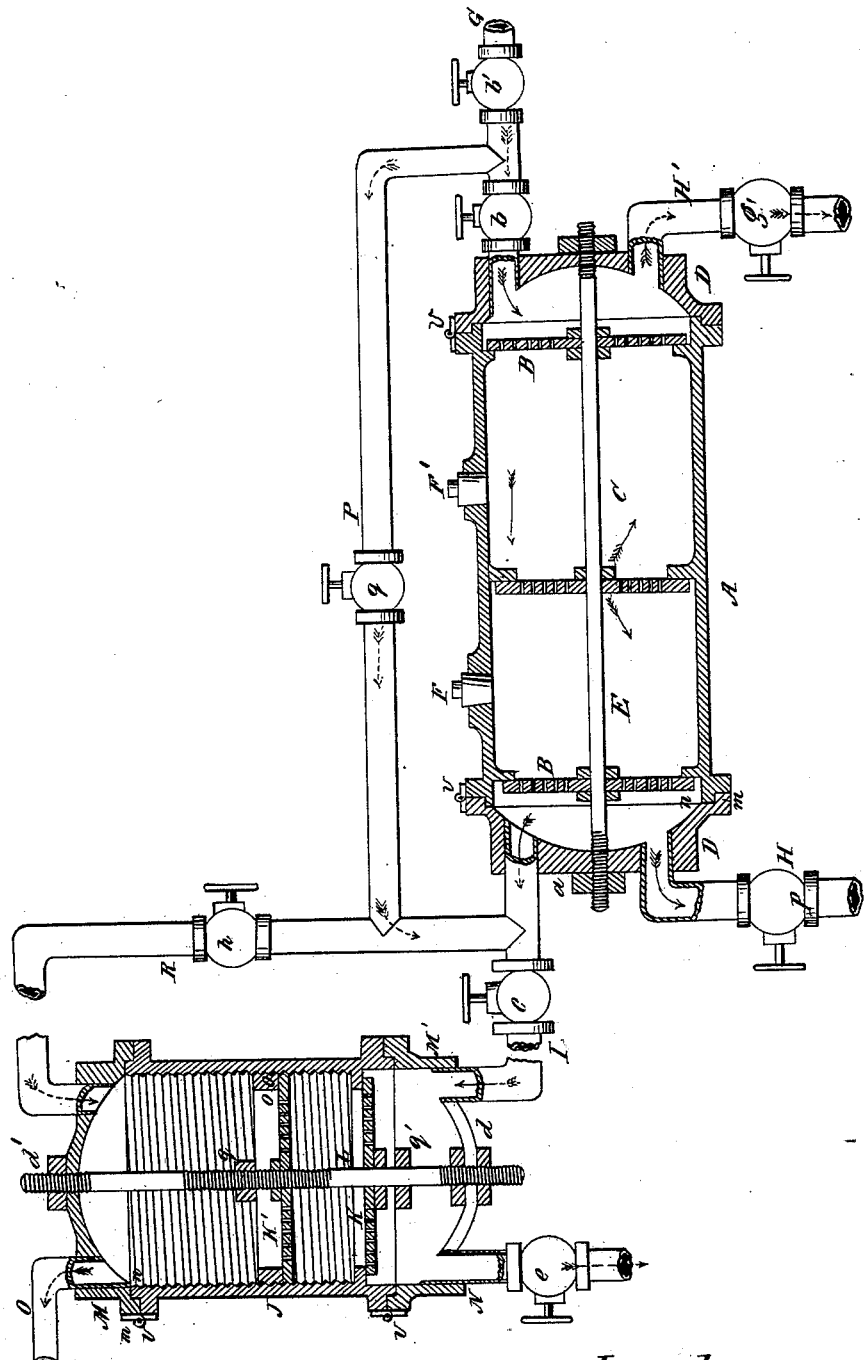
Witnesses
James W. Hunter
Joseph Spence
Inventor
William A. Pitt

UNITED STATES PATENT OFFICE.

WILLIAM A. PITT, OF NEW YORK, N. Y.

FILTER.

SPECIFICATION forming part of Letters Patent No. 225,863, dated March 23, 1880.

Application filed April 24, 1879.

*To all whom it may concern:*

Be it known that I, WILLIAM A. PITT, of New York, in the county and State of New York, have invented a new and useful Improvement in Filters, of which the following is a specification, reference being had to the accompanying drawing.

This invention relates to certain improvements in that class of filters which are designed to be connected to the service-pipe of the house or with other means of furnishing a supply of water under pressure with a view of removing the impurities contained in the liquid by compelling it to flow through a series of filtering mediums before it reaches the point of discharge.

My improvement consists in the peculiar construction and arrangement of filtering tanks or receptacles in operative connection with the service-pipe, having means for compelling the water to pass through the several filtering substances contained in said tanks in order to be effectually freed from all impurities before delivery to the building; also consists in the use of adjustable perforated plates for accelerating the filtration by pressure; and, finally, in the arrangement of pipes communicating with the filtering-tanks in such a manner that reversible currents may be carried through the chambers in order to effectively dislodge all accumulated impurities and convey them to the sewer-pipe.

The accompanying drawing represents a horizontal and a vertical section of my improved filtering tanks or vessels with the pipe-connections.

A is the lower or horizontally-disposed cylindrical tank, and the one more directly connected with the service-pipe of the house.

B B B are perforated diaphragms, which divide the chamber C into two compartments.

D D are caps or covers on the ends of the tank, which are removable, and are made so as to form a tight joint when screwed down, as will hereinafter be described.

A rod, E, passes centrally through the chamber C, through the perforated plates B B, &c., extending beyond the heads or covers D D, and is provided with a screw-threaded end, upon which the nuts $a$ $a'$ work to secure the cylinder-heads in position.

F F' are openings provided in the upper portion of the tank A for use when it becomes necessary to recharge the chambers with fresh filtering material.

G is the water-supply pipe, which is provided with stop-cocks $b$ $b'$, and communicates with the tank A at the upper end.

H H' are discharge-pipes located at the bottom of the tank, and are designed to carry off to the sewer-pipe or other suitable reservoir the impure matter deposited in the chamber and held in suspension in the filtering material during the passage of the water.

I is a horizontal pipe provided with cock $c$, which connects the receiving or first filtering-tank, A, with the second tank, J.

The covers or heads D D are constructed with a depression, $m$, into which the shoulder $n$ on the cylinder-body fits, thereby forming a tight joint.

Hinges $v$ $v$ hold the heads on the cylinder. Either or both of the compartments of the chamber C may be filled with charcoal or other suitable filtering medium.

The second filtering-tank, J, is placed at an elevation above the tank A, preferably in an upright position. Its construction is similar to that of the tank A.

J is the body of the filter, cylindrical in form.

K K' are perforated plates, which form the top and bottom of a chamber for a packing of felt.

L is a rod passing centrally through the vessel, and on which the plates are moved and adjusted at any required point in order to effect a greater or less pressure upon the filtering material which is confined between said plates.

M M' are the heads or covers on the top and bottom of the tank. These are constructed and confined in position in the same manner as described in vessel A.

The chamber formed by the plates K K' is filled by layers of felt, sponge, or other equivalent porous material, and filtration may be accelerated or decreased by the amount of pressure brought to bear upon the filtering medium contained therein.

$d$ $d'$ are nuts, which work on the rod L, and are screwed down to hold the covers firmly in position.

N is a pipe provided with cock e, leading from the bottom of the vessel to a sewer-pipe or other reservoir for the discharge of impure water during the cleansing operation.

q is a nut working on the rod L, and may serve to adjust plate K', used alone or in conjunction with the ring o.

The interior of the tank J is threaded from its top to any requisite depth necessary, and a cylinder-ring, o, likewise threaded, works up and down to serve as a means of adjusting the plate K' at any point within the chamber in order to effect a greater or less pressure upon the felt contained between the plates. The plate K is preferably made stationary.

O is the discharge-pipe in top of filter for conveying the water in a purified condition to the building, and is provided with stop-cock.

P is a pipe running horizontally with the tank A, having cock g, through which the water is carried to produce a reverse current for cleansing the vessel A.

R is a vertical pipe having stop-cock h, communicating with pipes P and I, which enters the top of the vessel J to convey the cleansing-water in a reverse direction through the vessel, from whence it is discharged through pipe N.

The filtering-tanks are connected by the pipe I, which leads from the upper part of the tank A into the bottom of tank J, so that a direct upward current of inflowing water is effected through the second vessel.

The operation is as follows: When the cocks b' b in the water-supply pipe G and the cock c in the connecting-pipe I are opened and the remaining cocks closed the water from pipe G will flow through the sand and charcoal strata in the chamber C, thence onward through the pipe I into the bottom of the tank J, and up through the filtering medium contained between the perforated plates, pressure being exerted upon the felt to accelerate the filtration, and is discharged through pipe O in a thoroughly-purified condition.

In order to cleanse the filter of the accumulation of sedimentary matter or other deposit that collects during the passage of the water, and is held in suspension in the charcoal and felt, I carry reverse currents of water through the filtering-chambers in such a manner that every part becomes in turn subjected to the cleansing operation.

The operation of cleansing is as follows: The cocks h and c in pipes R and I are closed when it is designed to cleanse only the tank A. All communication with the tank J is then cut off. The cocks b' b in pipe G then being opened, the water will flow into the tank A and through the filtering strata in an oblique direction, as indicated by the arrows, and is discharged through pipe H into the sewer. By closing the cock b and opening cocks g and g' the water will flow up through the pipe P and on down into the tank A, and through it in a reverse and oblique direction, dislodging and carrying with it the impure deposits and discharging them through the pipe H'.

When it is necessary to cleanse the tank J the cocks g and c in pipes P and I are closed. The inflowing water is then compelled to traverse the chamber C, and thence on in a partly-purified condition up the pipe R (cock h having been opened) into the upper part of the tank J, whence it percolates through the felt strata, the plate K' being adjusted by means of the cylinder-ring o or the nut q, working on the rod L, to suitably compress the felt, flowing in a direction the reverse of its usual course, removing the impurities and discharging them through pipe N.

By reason of my arrangement of the supply and discharge pipes the reverse currents of water are carried obliquely across the chamber and the cleansing operation greatly facilitated.

The filtering-vessels A and J may be used together or separately.

In the adjustment of the pressure-plate K' the cylinder-ring o may be used to adjust the plate at any desired point and the nut q dispensed with, or they may be used together.

I claim—

1. In a filtering apparatus, the tanks A and J, connected together by pipe I, in combination with the induction-pipe G, provided with cocks b' b, all arranged and operating in the manner and for the purpose described.

2. In a filtering apparatus, the tanks A and J, pipe I, and induction-pipe G, in combination with the pipes P and R and discharge-pipes H, H', and N, located at the bottom of said tanks, all arranged to operate substantially as described.

3. In a filtering vessel, a chamber provided with an interior threaded portion and a cylinder-ring adapted to work therein, in combination with an adjustable perforated plate, all arranged and operating substantially as and for the purpose set forth.

4. In combination with a filtering-vessel, the plates K and K', cylinder-ring o, rod L, and nut q, all arranged and operating substantially as described.

5. In a filtering-vessel, the combination, with the covers D D, of the hinges v v, the rod E, and nuts a a', all constructed to operate as and for the purposes set forth.

6. In combination with a filtering-vessel, the perforated diaphragms B B B, rod E, heads D D, nuts a a', and side apertures, F F', all constructed and arranged substantially as and for the purpose described.

WILLIAM A. PITT.

Witnesses:
JAMES H. HUNTER,
JOSEPH SPENCE.